United States Patent [19]

Norgren et al.

[11] Patent Number: 4,660,169
[45] Date of Patent: Apr. 21, 1987

[54] ACCESS CONTROL TO A SHARED RESOURCE IN AN ASYNCHRONOUS SYSTEM

[75] Inventors: Kent S. Norgren, Longmont; Robert E. Vogelsberg, Boulder, both of Colo.

[73] Assignee: International Business Machines Corporation, Armonk, N.Y.

[21] Appl. No.: 511,053

[22] Filed: Jul. 5, 1983

[51] Int. Cl.⁴ .......................... G06F 3/04; G06F 9/00
[52] U.S. Cl. ........................................................ 364/900
[58] Field of Search ... 364/200 MS File, 900 MS File; 340/825.2; 375/106, 107, 110

[56] References Cited

U.S. PATENT DOCUMENTS

| | | | |
|---|---|---|---|
| 3,886,524 | 5/1975 | Appelt | 340/172.5 |
| 3,997,896 | 12/1976 | Cassarino et al. | 340/172.5 |
| 4,084,233 | 4/1978 | Handly et al. | 364/200 |
| 4,106,104 | 8/1978 | Nitta et al. | 364/900 |
| 4,148,011 | 4/1979 | McLagan et al. | 340/147 |

FOREIGN PATENT DOCUMENTS 0030978  7/1981  European Pat. Off.

OTHER PUBLICATIONS

Patents Abstracts of Japan, vol. 5, No. 86 (E-60)(758), Jun. 5, 1981 "Control Circuit for Right of Transmission", 56-32855.

Primary Examiner—Archie E. Williams
Assistant Examiner—Niessen William G.
Attorney, Agent, or Firm—Charles E. Rohrer

[57] ABSTRACT

Independent asynchronous bus master devices share a common bus with control lines serially connecting each bus master in a daisy-chain contiguration. A Bus Acknowledge signal is received by a local bus master which is thereby enabled to seize control of the bus without an input synchronization delay by first inhibiting synchronization means to prevent the passage of the Bus Acknowledge signal to a downstream device for a period of time sufficient to stabilize an output signal indicating such passage. In that manner, the output signal may be used to control the immediate enabling of local bus seizure thereby avoiding local synchronization delay.

7 Claims, 5 Drawing Figures

ACCESS CONTROL TO A SHARED RESOURCE IN AN ASYNCHRONOUS SYSTEM

This invention relates to data processing systems and more particularly to circuit and method for controlling access to a common bus where the bus masters are asynchronous to each other.

BACKGROUND OF THE INVENTION

Various methods have been devised for organizing control over a bus when that bus is connected to more than one bus master. The problem is particularly significant where the bus masters are asynchronous since no common clock signal upon which to time connection events is present in such a system. One type of control frequently used for asynchronous bus masters is to serially connect the bus masters in a loop where the first bus master is the priority device and each succeeding device in the so-called "daisy-chain" is of lower priority. In systems of this kind, when a bus master desires access to the bus, it issues a Bus Request which is sent to a bus arbitrator to determine whether the bus is currently available. If the bus is available, a Bus Acknowledge signal is sent from the bus arbitrator to the first bus master, that is, the highest priority unit connected to the bus. Upon receipt of the Bus Acknowledge signal, the first bus master synchronizes that signal to its own local clock and determines whether it needs to access the bus. If it has a Local Bus Request outstanding, it seizes control of the bus and performs its operation. If the first bus master has no Bus Request outstanding, it passes the Bus Acknowledge signal to the second bus master. That bus master synchronizes the Bus Acknowledge signal with its local clock and then determines whether it has a Local Bus Request outstanding. If it does not, it passes the Bus Acknowledge signal along to the third bus master and so on until finally the bus master with a Bus Request outstanding receives it.

In the above-described system, significant time delay occurs at each bus master in synchronizing the received Bus Acknowledge signal to a local clock. However, synchronization must be performed before passing the signal along since if the first bus master fielded the Bus Acknowledge signal and seized control of the bus for itself and at the same time allowed the Bus Acknowledge signal to be passed along to subsequent bus masters, they would also initiate a process for seizing the bus. To correct that situation, the first bus master would then have to issue a Not Bus Acknowledge signal in order that the subsequent bus masters could then halt their processes already begun. The result would be confusion in the downstream bus masters from which recovery might be impossible. To prevent that, a synchronization circuit is established at each bus master to synchronize the receipt of the Bus Acknowledge signal to a local clock. That resulting delay can be significant in that the time used to synchronize the signal can be ten percent or more of the cycling time of the bus master. The object of this invention is to eliminate at least a portion of that delay.

SUMMARY OF THE INVENTION

This invention allows the interconnection of Bus Acknowledge signals of two or more independent asynchronous bus masters in a daisy-chain configuration without any input synchronization delay for the first of the bus masters in the daisy-chain and with one less set of synchronization delays for all the subsequent bus masters in the daisy-chain. The elimination of synchronization delay allows a significant reduction in the total bus cycle time for each of the bus masters and a corresponding increase in performance.

Briefly stated, this invention allows a bus master to seize the bus upon receipt of a Bus Acknowledge signal without incurring any synchronization delay and, to enable that seizure, the bus master inhibits the clocking of synchronization latches in order to prevent the issuance of a Bus Acknowledge Pass signal to the next downstream processor. The technique involves the inhibition of the clocking of synchronization latches for a short period of time prior to the issuance of a Local Bus Request Required signal to insure a stable Bus Acknowledge Pass signal at the time the bus master inspects its need for the bus. If the bus master determines that it does require control of the bus, it continues to inhibit the clocking of the synchronization latches for a period of time sufficient to complete its seizing control of the bus and to inform the bus arbitrator that it has taken control.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

DETAILED DESCRIPTION

Figure 1:
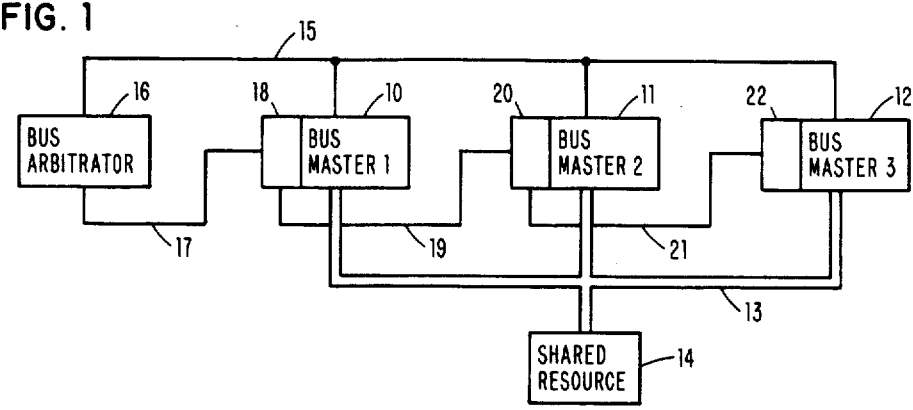
FIG. 1 illustrates a serially interconnected group of bus masters sharing a common bus for access to a shared resource.

FIG. 1 illustrates the environment in which the invention is practiced where three bus masters 10, 11, and 12 are connected by a common bus 13 to a shared resource 14. For example, the bus masters can be three different data processors sharing a common memory, and either the memory or the common bus can be considered to be the shared resource. Control over bus 13 is obtained by a bus master through the Issuance of a Bus Request signal over control line 15 to bus arbitrator 16. If the bus is available, the bus arbitrator issues a Bus Acknowledge signal over line 17 to the line control section 18 of bus master 10. If bus master 10 has not issued a request for the bus, the Bus Acknowledge signal will be passed along over line 19 to the line control section 20 of the second bus master 11. If the second bus master has not issued a Bus Request signal, the Bus Acknowledge signal will then be passed along over line 21 to the line control section 22 of the third bus master 12.

When a bus master with an outstanding Bus Request signal receives the Bus Acknowledge signal at its input section, it then seizes control of the bus 13 and blocks the passing of the Bus Acknowledge signal to the next downstream bus master. The bus master with control of the bus sends a signal to the bus arbitrator 16 which then drops the Bus Acknowledge signal that it has sent out. In that manner, the bus master with control of the bus is allowed to keep control of the bus for at least one cycle.

Figure 2:
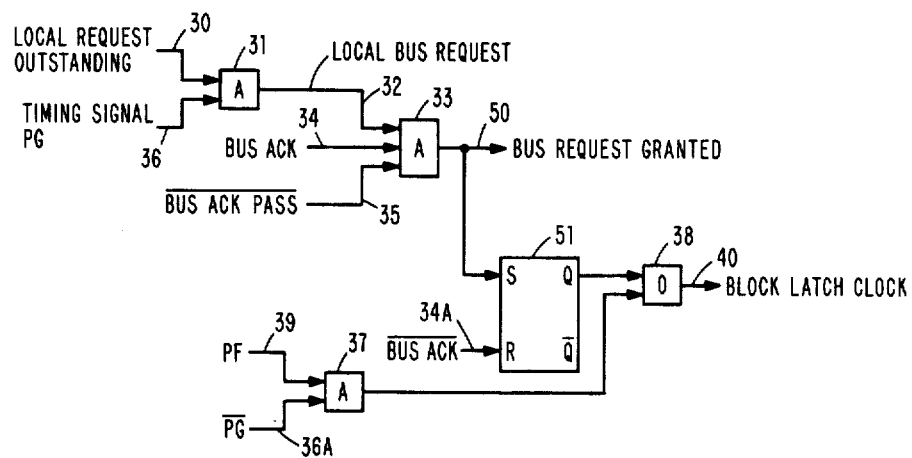
FIG. 2 shows a simplified circuit to outline the concept of the invention.
Figure 3:
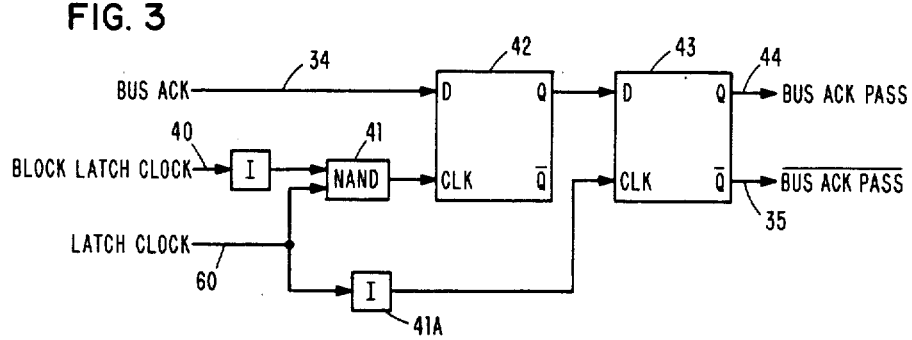
FIG. 3 shows a synchronization latch circuit for use with the invention.

FIG. 2 is a simplified circuit showing the concept of the instant invention and, when combined with FIG. 3, provides a simplified circuit for use in the line control sections 18, 20, and 22 of each of the bus masters shown in FIG. 1. Basically, the circuit of FIG. 2 is designed to implement the concept that a bus master with a Local Bus Request signal outstanding will be empowered to seize the bus upon receipt of the Bus Acknowledge signal without incurring a synchronization delay. The condition upon which such bus siezure is allowed is that an active Bus Acknowledge Pass signal has not been sent to a downstream bus master.

The circuits shown in FIG. 2 implement the concept in the following manner. Suppose that the bus master 1 has a local request outstanding, signal 30, at a point in time when its local timing cycle issues timing signal PG, signal 36, to enable AND circuit 31. At that point in its own local cycle, a Local Bus Request signal 32 is supplied to AND circuit 33. If a Bus Acknowledge signal 34 has been received from the bus arbitrator 16, AND circuit 33 will enable bus master 1 to seize the bus upon the condition that a previous Bus Acknowledge signal has not been passed along to a downstream processor. That condition is satisfied by Not Bus Acknowledge Pass signal 35 as an input to AND circuit 33. Thus, the portion of the circuit described so far enables bus master 1 to seize control of the bus 13 upon the activation of AND circuit 33 without synchronizing the Bus Acknowledge signal to its internal clock.

In order to allow the issuance of the Bus Request Granted signal 50 to the first bus master, it is necessary that the Bus Acknowledge Pass signal be stable. That is, it is necessary to have synchronized any previous Bus Acknowledge signal so that the Bus Acknowledge Pass signal will be a stable input to AND circuit 33. To accomplish that stability, it is necessary to block any change in the synchronization circuit shown in FIG. 3 for a period of time preceding the issuance of timing signal PG, signal 36. That is accomplished through AND circuit 37 and NOR circuit 38 which will issue a Block Latch Clock signal 40 upon receipt of timing signal PF, signal 39. The Block Latch Clock signal 40 is inverted and provided to NAND circuit 41 (FIG. 3) which prevents the clocking of synchronization latch 42. In that manner, the stability of the output of latch 43 is ensured since latch 43 changes state only in response to a change of state in latch 42. That is, the stability of the Bus Acknowledge Pass signal 44 and the Not Bus Acknowledge Pass signal 35 is ensured at the time the Local Bus Request signal 32 is issued. The requirement is that timing signal PF precede timing signal PG by a time sufficient to stabilize latches 42 and 43.

In FIG. 2, once a Bus Request Granted signal, signal 50, is issued, a latch 51 is set whereby the Block Latch Clock signal 40 continues to inhibit the processing of a Bus Acknowledge signal 34 by latches 42 and 43. In that manner, the Bus Acknowledge signal 34 cannot be passed along to downstream processors (as Bus Acknowledge Pass Signal 44) during the period of time when Bus Acknowledge signal 34 is active and the first bus master is in the process of seizing bus 13. Once bus 13 has been successfully seized by the first bus master, it will then issue a signal to the bus arbitrator to drop the Bus Acknowledge signal 34 thereby raising Not Bus Acknowledge signal 34A to reset latch 51.

In the event that the first bus master 10 had no local request outstanding during the time period at which timing signal PG, signal 36, is active, the first bus master will not seize control of the bus and hence latch 51 will not be set. In that event, latches 42 and 43 will be inhibited only for a short period of time when AND circuit 37 is active, i.e., the period between the issuance of timing signals PF and PG. Before and after that time, the receipt of a Bus Acknowledge signal 34 will result in a synchronization of the Bus Acknowledge signal and a passing along of that signal to a downstream processor (as Bus Acknowledge Pass Signal 44).

From the above description, it is observed that should a downstream bus master issue a Bus Request signal causing bus arbitrator 16 to issue a Bus Acknowledge signal to the first bus master, it is possible for the first bus master to "steal" the Bus Acknowledge signal by issuing its own Local Bus Request signal during the period of time in which AND circuit 37 is active. Thus, the higher priority bus master can not only achieve a savings in time delay by not synchronizing the Bus Acknowledge signal before using it, it can also achieve a time savings in "stealing" a Bus Acknowledge signal from a downstream lower priority processor.

Also, the time period in which AND circuit 37 is active must be long enough to prevent any possibility of instability in the Not Bus Acknowledge Pass signal 35. To satisfy that requirement, the period between timing signals PF and PG should be long enough to cover the propagation time of a Bus Acknowledge signal through the latch circuits 42 and 43 plus a time period to cover metastable conditions in latch 42 due to the lack of synchronization between the receipt of Bus Acknowledge signal 34 and the receipt of Latch Clock signal 60.

Figure 4:
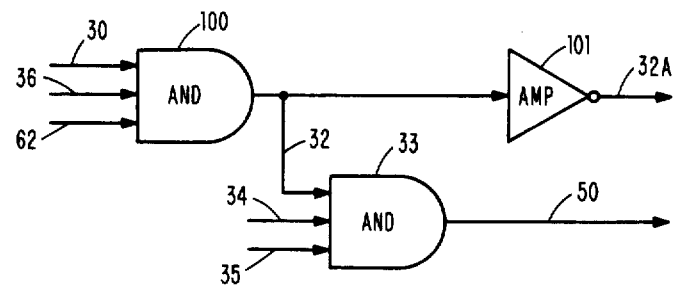
FIG. 4. shows a detailed implementation of the invention.
Figure 4:
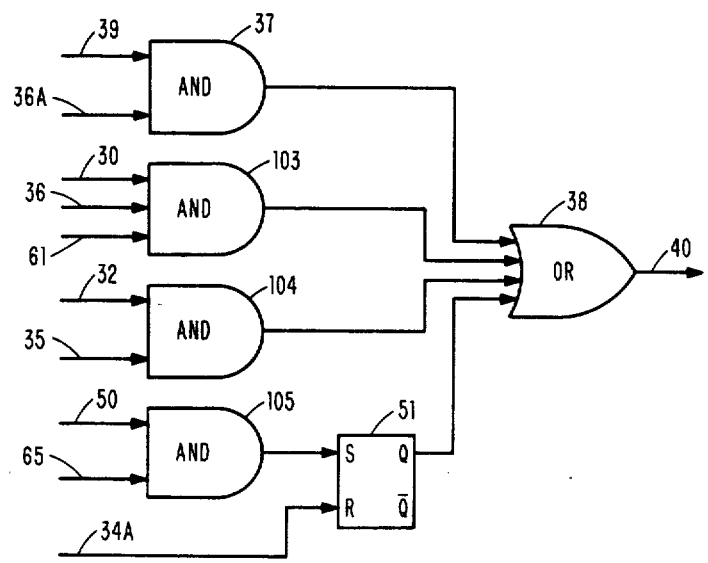
Figure 5:
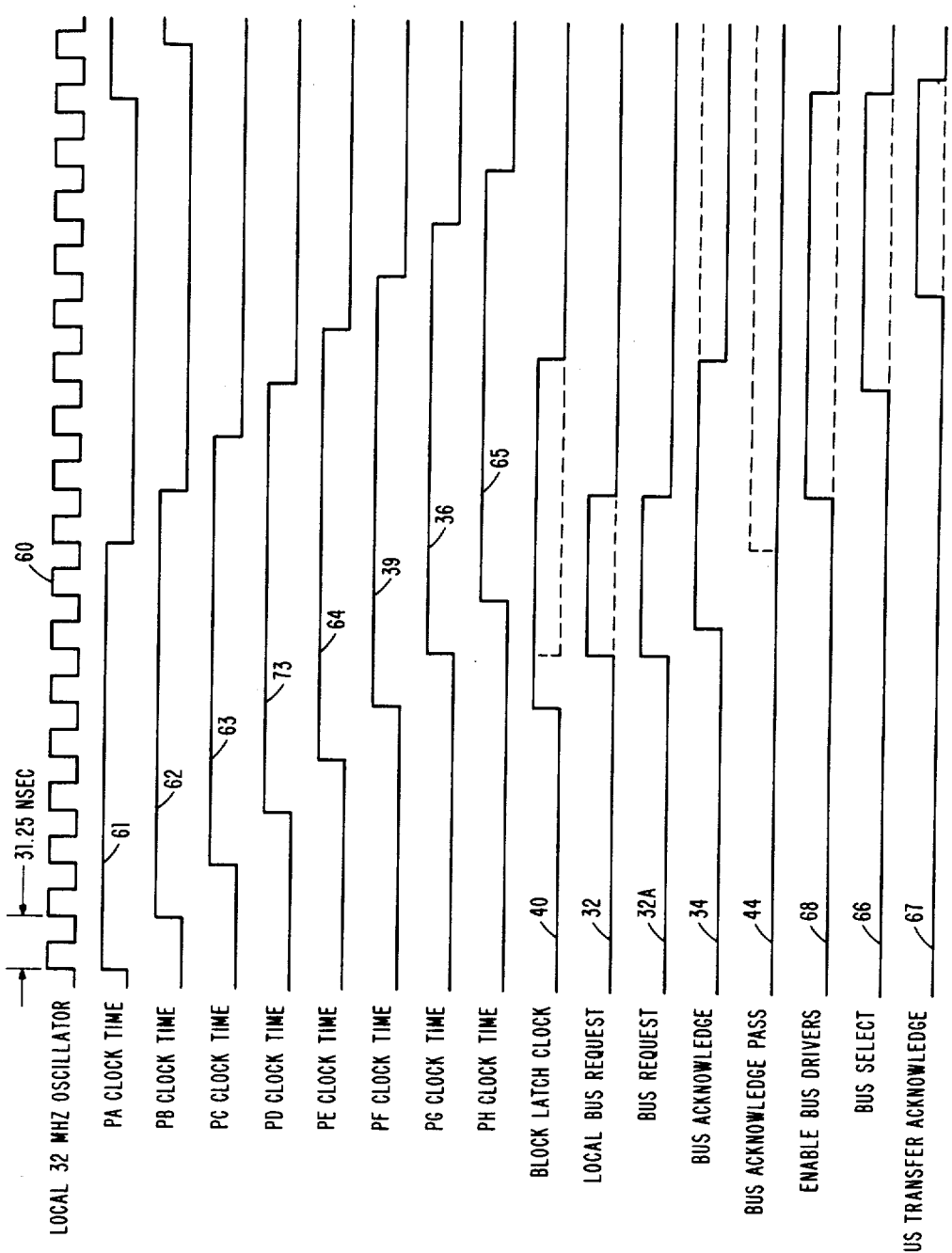
FIG. 5 is a timing diagram for use with the circuit of FIG. 4.

A more detailed description of a particular implementation of the invention will now be provided with reference to FIGS. 4 and 5 together with the synchronization latch circuit of FIG. 3.

In the timing diagram of FIG. 5, the first signal shown is the local bus master latch clock signal, signal 60, which is a 32 MHz square wave in the particular implementation being described. The next eight illustrated signals, labelled PA through PH, are the outputs of a ring counter (not shown) which is driven by the 32 MHz square wave to provide local timing signals. The counter may be stopped following the PA timing signal to wait for a Bus Acknowledge signal from the bus control logic and it may be stopped following the PF signal to wait for a bus transfer acknowledge signal from the resource addressed during the bus cycle. These wait periods are of an indeterminate duration in an asynchronous system. The timings shown in FIG. 5 are used only to illustrate the functioning of the bus acknowledge circuit of FIG. 4 described in this invention. Many other timings are possible.

In the logic circuit of FIG. 4, the output signal from AND-gate 100 is the Local Bus Request signal 32. This signal is generated when the local bus master determines that a bus cycle should be requested and initiates signal 30, Bus Request Required, which is combined with the rise of the PG clock time, signal 36, and the fall of the PB clock time, signal 62, to generate the duration of a Local Bus Request signal 32. Since the ring counter can be stopped between the end of PA time and the end of PB time, as mentioned above, to await the arrival of a Bus Acknowledge signal, the actual duration of the Local Bus Request signal 32 will vary depending upon the bus response. Signal 32 is amplified by the open-collector driver 101 to produce signal 32A which is combined with the other bus master requests to form a global Bus Request signal for presentation to the bus arbitrator 16 over line 15 (FIG. 1).

The AND-gate 33 is used to determine when a requested bus cycle has been made available to the bus master. Its output, Bus Request Granted signal 50, will be activated when the Bus Acknowledge signal 34 is active, the Local Bus Request signal 32 is active, and the Bus Acknowledge signal has not been propagated to the next bus master in the daisy-chain, i.e., Not Bus Acknowledge Pass signal 35 is active. Issuance of the Bus Request Granted signal 50 allows the ring counter to continue from the wait state at the end of clock time PA. It is also used to block the propagation of the Bus Acknowledge signal 34 to the next bus master in the daisy-chain as shown by AND circuit 105.

Since signal 50 is used with AND circuit 105 to block passage of the Bus Acknowledge signal 34, it is necessary to prevent simultaneous or nearly simultaneous changes in the inputs to the AND-gate 33. As previously mentioned, a standard prior art approach to achieve this was to synchronize the Bus Acknowledge signal 34 to the internal clock. As noted earlier, this adds delay to the bus acknowledge response time. This embodiment of the invention avoids input delay by controlling gate 33 from the Not Bus Acknowledge Pass signal 35 (which is an output signal of latch 43, FIG. 3) instead of controlling entirely from the Bus Acknowledge signal 34 (which is an input signal).

During bus operation, when the local bus master does not have an active Local Bus Request, the Bus Acknowledge signal 34 is propagated through two stages of latches 42 and 43, FIG. 3, and sent on to the next bus master in the daisy-chain as a Bus Acknowledge Pass signal 44. In this case, the Block Latch Clock signal 40 is inactive and the 32 MHz square wave signal is used to clock the latches via the NAND-gate 41 and the Inverter 41A. During a cycle when the local bus master may need to make a bus request, the Block Latch Clock signal 40 is activated one clock pulse in advance of the point (timing signal PG) at which a stable input signal 35, is required by the internal logic to gate circuit 33. This block (provided by circuits 37 and 38) prevents additional clock pulses at the input to the latch 42. (The clock to the second latch continues.) Thus, the latch 42 stabilizes at a known level and is clocked into the second stage latch 43 before the Not Bus Acknowledge Pass signal 35 is used by the internal logic at gate 33. The stable state of the two latches 42 and 43 is kept unchanged by circuits 103 and 104 until the local logic has determined whether the bus cycle can be used by the local bus master and, if so, until appropriate internal states have been established.

If the bus is to be seized by the bus master, the logic gates 37, 38, 103, and 104, are used to inhibit the clocking of latch 42 until the local logic state at gate 105 has been established. The AND-gate 37 ANDs together the PF (signal 39) and inverted PG signals (signal 36A) that are used to inhibit the clock prior to the time at which signal 35 stability is required. This occurs prior to the generation of the Local Bus Request signal 32 and is needed to provide a stable stage of clocking prior to the use of the output of latch 43. If no Local Bus Request is required for this cycle, the clock signal will be enabled again when the output of AND-gate 37 goes inactive with the rising of PG clock time. Any Bus Acknowledge signals present are then propagated as shown by the dotted lines in FIG. 5. However, if a Local Bus Request is required, signal 30 is active and the AND-gate 103 continues to inhibit the clock signal 60 until the falling of the PA clock time, signal 61. (This sequence is shown by the solid lines in FIG. 5.)

By the falling of the PA clock time, the output of the synchronization latches 42 and 43 has been stabilized. (The latches actually stabilize by PH clock time, signal 65.) The AND-gate 104 is used to continue to prevent the clocking of the latches 42 and 43 if the Local Bus Request is active and the Not Bus Acknowledge Pass signal 35 is active. This state is maintained until a Bus Acknowledge signal 34 received by AND-gate 33 is deactivated by the bus arbitrator 16. The AND-gate 33 generates the Bus Request Granted signal 50 which allows the ring counter to continue running. The Bus Request Granted signal 50 is latched by the Set/Reset latch 51 via the AND-gate 105 (the clock time PH is used to prevent setting of the latch 51 prior to stabilization of the synchronization latches). The Set/Reset latch 51 output is used to continue blocking the latch clock signal 60 until the current bus cycle arbitration is complete and the input Bus Acknowledge signal 34 goes inactive. As shown in FIG. 5, this happens shortly after the activation of the Bus Select signal 66 by the bus master. For completeness, FIG. 5 also shows the Bus Transfer Acknowledge signal 67 response to the Bus Select signal which finishes the cycle and allows the bus arbitrator 16 to rearbitrate the bus.

Other signals in FIG. 5 are the Bus Request signal 32A and the Enable Bus Drivers signal 68. Signal 32A is the request signal issued to the bus arbitrator over line 15 (FIG. 1) and is combined with all other request signals from other bus masters for presentation to the bus arbitrator. Signal 68 is the signal generated in the bus master to seize control of the bus 13.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for resolving contention among a plurality of asynchronous bus master devices connected to a common bus, comprising:

bus arbitrator means connected to receive a bus request signal from any one of said bus master devices and for issuing a bus acknowledge signal in response to said bus request signal to indicate that said bus is free;

means for serially connecting each said bus master device in order of priority with the highest priority bus master directly connected to said bus arbitrator device to serially transmit said bus acknowledge signal to said bus master devices in their order of priority; and a first local line control means serving as an input section of said highest priority bus master device and connected to receive said bus acknowledge signal from said bus arbitrator device, said first local line control means for generating a local bus request granted signal to enable said highest priority bus master device to seize control of said bus without first synchronizing said bus acknowledge signal with control timings for said highest priority bus master.

2. The system of claim 1 wherein said first local line control means contains means for generating a bus acknowledge pass signal and wherein said highest priority bus master device further includes synchronization means operating upon the condition that said highest priority bus master device has no outstanding bus request signal for synchronizing said bus acknowledge signal with said highest priority bus master device control timing signals before said first line control means generates a bus acknowledge pass signal to send to the next downstream bus master device.

3. The system of claim 2 wherein said highest priority bus master device further includes inhibiting means for preventing the generation of said bus acknowledge pass signal for a period of time prior to the local cycle time for issuing a local bus request signal, wherein said period of time is sufficient to allow said synchronization means to stabilize.

4. The system of claim 3 wherein said inhibiting means continues to inhibit the passage of said bus acknowledge pass signal to said next downstream device when said local bus master issues a local bus request signal and said bus acknowledge pass signal is inactive.

5. In a system for resolving contention among a plurality of asynchronous bus master devices connected to a common bus, wherein said system includes bus arbitrator means connected to receive a bus request signal from any one of said bus master devices desiring the use of said bus and wherein each of said bus master devices are serially connected in order of priority with the highest priority bus master device directly connected to said bus arbitrator means so that said highest priority bus master device is first to receive a signal issued by said bus arbitrator means indicating that said bus is free to use, and in the case wherin said highest priority bus master device has no outstanding bus request signal, said highest priority bus master device propagates said signal indicating that bus is free to downstream bus master devices in accordance with priority, the method of enabling a bus master device receiving said signal indicating that the bus is free to seize control of said bus without a delay to synchronize said signal indicating that the bus is free to local bus master control timing signals comprising the steps of:

upon the issuance of said bus request signal to said bus arbitrator means by a particular bus master device, issuing a local bus request signal for use in the local input line control section of that particular bus master device;

combining said local bus request signal with said signal indicating that the bus is free to generate a bus request granted signal, said bus request granted signal being issued within said line control section without first synchronizing said signal indicating that the bus is free with local bus master control timing signals.

6. The method of claim 5 further including the step of:

synchronizing said signal indicating that the bus is free with local timing signals before passing said signal indicating that the bus is free to the next downstream device.

7. The method of claim 6 further including the step of:

inhibiting the passage downstream of said signal indicating that the bus is free whenever the local bus master acts to seize control of said bus.

* * * * *